United States Patent [19]

Matsuyama et al.

[11] Patent Number: 4,772,505
[45] Date of Patent: Sep. 20, 1988

[54] MAGNETIC BUBBLE MEMORY ELEMENT

[75] Inventors: Haruhiko Matsuyama, Hiratsuka; Fusaji Shoji, Yokohama; Hiroshi Umezaki, Tokyo; Masatoshi Takeshita, Tokyo; Naoki Koyama, Tokyo; Ryo Suzuki, Tokyo, all of Japan

[73] Assignee: Hitachi, Ltd., Tokyo, Japan

[21] Appl. No.: 897,368

[22] Filed: Aug. 18, 1986

[30] Foreign Application Priority Data

Aug. 7, 1985 [JP] Japan ................................ 60-172321
Nov. 18, 1985 [JP] Japan ................................ 60-256744

[51] Int. Cl.$^4$ ............................................. G11C 11/02
[52] U.S. Cl. ........................... 428/209; 156/DIG. 63; 365/33; 427/131; 427/132; 428/216; 428/336; 428/692; 428/693; 428/900; 428/473.5; 428/477.7; 428/458
[58] Field of Search ............... 427/131, 132; 428/695, 428/693, 692, 447, 216, 336, 473.5, 446, 209, 477.7, 458; 156/DIG. 63

[56] References Cited

U.S. PATENT DOCUMENTS

| 3,179,634 | 4/1965 | Edwards | 428/457 |
| 4,229,248 | 10/1980 | Silverman | 427/132 |
| 4,262,054 | 4/1981 | Umezaki et al. | 428/336 |
| 4,664,941 | 5/1987 | Washburn | 427/132 |

OTHER PUBLICATIONS

T. W. Hou, et al, "Ion Milling Planarization for Magnetic Bubble Devices," *J. Vac. Sci. Technol.* A1(4), Oct.–Dec. 1983, pp. 1801–1805.

*Primary Examiner*—Ellis P. Robinson
*Attorney, Agent, or Firm*—Antonelli, Terry & Wands

[57] ABSTRACT

The inclination angle, in the conductor pattern end portion of a magnetic bubble memory element having a bubble diameter of up to 1.2 μm, can be remarkably reduced by employing a polymer resin, having fluidity in a curing process, as the insulation film under the conductor pattern, so that the transfer margin is greatly improved.

9 Claims, 4 Drawing Sheets

MAGNETIC BUBBLE MEMORY ELEMENT

BACKGROUND OF THE INVENTION

This invention relates generally to a magnetic bubble memory element having a soft magnetic material pattern on a conductor pattern through an inter-laminar insulation layer, and more particularly to an inter-laminar insulation layer to obtain an excellent bubble transfer property in a high density element using a bubble having an extremely small diameter of below 1.2 μm.

In the magnetic bubble memory element, the soft magnetic material pattern is formed on a bubble garnet film and a rotating magnetic field is applied in an in-plane direction to generate magnetic poles at the end portions of the pattern. Bubble transfer is made by use of these poles. On the other hand, the soft magnetic material pattern is formed on the conductor pattern through the inter-laminar insulation film. Therefore, if the level difference of the conductive pattern is transferred as such to the soft magnetic material pattern, the level difference occurs in the soft magnetic material pattern, too, and magnetic poles are generated in the portion having the level difference by the rotating magnetic field or by a bias magnetic field in a vertical direction. The poles in this level-difference portion exert adverse influences upon the bubble transfer, thus deteriorating transfer characteristics.

In order to solve this problem, a method has been proposed, as disclosed in Japanese Patent Laid-Open No. 22293/1980, for example, wherein a thermosetting resin is used as the inter-laminar insulation film between the conductor pattern and the soft magnetic material. This method comprises coating with a thermosetting resin solution and thermosetting the resin to form a resin insulation film. This method can be thought to be an extremely simple flattening method having high reproducibility because it can flatten the level difference of the conductor pattern by utilizing the fluidity of the thermosetting resin solution.

When a transfer path for ultrafine bubbles having a diameter of below 1.2 μm is formed by this method, however, the transfer characteristics are found to be unsatisfactory. In other words, it has been clarified that the transfer characteristics drop in the level-difference portion of the conductor pattern in this case.

FIG. 3 of the accompanying drawings is a diagram showing the relationship between the transfer characteristics in this level-difference portion and the bubble diameter. Each of the samples used to determine this relationship was obtained by forming a first insulation film, a conductor pattern, a second insulation film and a soft magnetic material pattern on a magnetic film having a respective bubble diameter. Polyimide isoindoloquinazolinedione belonging to the group of polyimide resins was used as the second insulation film. It can be understood from the diagram that a transfer margin (the range of a bias magnetic field necessary for the smooth transfer of the bubble) is at least 10% for bubbles having a diameter of greater than 1.2 μm and drops drastically when the bubble diameter is below 1.2 μm. In other words, the transfer margin of at least 10% is necessary in order to attain a satisfactory memory operation.

It has thus been clarified that the smaller the bubble diameter, the more insufficient the flattening effect in accordance with the prior art method. It may be assumed that when the bubble diameter is reduced, a bias magnetic field necessary for permitting the existence of the bubble increases, so that a great unnecessary magnetic pole occurs with respect to only a limited level difference of the soft magnetic material pattern.

In conjunction with the level difference that causes the unnecessary magnetic pole, an inclination angle ($\theta$) at the end portion of the conductor pattern, shown in FIG. 4 of the accompanying drawings, is more important than the extent of the level difference itself. In other words, magnetization inside the soft magnetic material tends to have a distribution as parallel and as continuous as possible due to the exchange interaction. For this reason, the magnetization inside the soft magnetic material in the level-difference portion described above faces substantially in a direction of the inclination angle. It is therefore believed that the greater the inclination angle ($\theta$), the more the unnecessary magnetic pole. Additionally, the influence of the bias magnetic field tends to direct the direction of magnetization in the level-difference portion further towards the vertical direction so that the vertical component of magnetization increases with an increasing bias magnetic field and hence, the unnecessary magnetic pole increases, too.

FIG. 5 is a diagram showing the relationship between the inclination angle ($\theta$) necessary for securing the transfer margin of 10% and the bubble diameter. The samples used to determine this relationship were the same as those used in FIG. 3, but the second insulation film was formed. It can be understood from FIG. 5 that the inclination angle must be from 20° to 0° when the bubble diameter is as small as below 1.2 μm, in order to secure the transfer margin of 10%.

SUMMARY OF THE INVENTION

An object of the present invention is to obtain good transfer characteristics in a magnetic bubble memory element using a bubble having a very small diameter of below 1.2 μm.

This object of the invention can be accomplished by stipulating the inclination angle of the second insulation film having a predetermined thickness at the end portion of the conductor pattern to from 20° to 0°.

In the present invention, a resin which causes fluidization upon heat-treatment is used for at least part of the second insulation film. In other words, the present invention utilizes not only the fluidization of the resin solution at the time of coating but also its melt-fluidization upon heat-treatment in order to remarkably reduce the inclination angle in the conductor pattern end portion. Accordingly, the object of the present invention can be attained by melting a polyimide precursor represented by the following general formula (I) or (II) by heating and curing the molten resin:

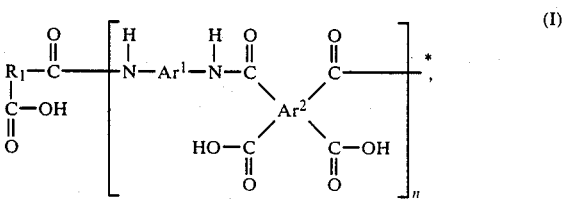

-continued $$-\overset{*}{N}-Ar^1-\overset{H}{N}-\overset{O}{\underset{\underset{O}{\overset{|}{C}-OH}}{C}}-R_1$$

(where R₁ is at least one group selected from among

HC≡C—[phenyl]—, N≡C—[phenyl]—,

[norbornenyl], [cyclohexenyl],

[methylcyclohexenyl] and [butenyl];

Ar¹ is at least one group selected from among

[diphenyl ether (meta,meta)],

[diphenyl ether (meta,para)],

[diphenyl ether (para,para)],

[diphenyl sulfone (meta)],

[diphenyl sulfone (meta,para)],

[diphenyl sulfone (para,para)] and

[diphenylmethane];

Ar² is at least one group selected from among

[biphenyl],

[benzophenone] and

[diphenyl ether];

and n is an integer of from 1 to 20); and $$(R^1O)_{3-m}\underset{R^2m}{\overset{|}{Si}}-R^3-NH-\left[\underset{\underset{HO=C}{\overset{O}{\underset{\|}{C}}}}{\overset{\overset{O}{\underset{\|}{C}}-NH-Ar^1-NH}{\underset{\|}{C}=OH}}-Ar^2\right]_n^*$$

(II)

$$*-\overset{O}{\underset{\|}{C}}-Ar^2\overset{\overset{O}{\underset{\|}{C}}-NH-R^3-\underset{R^2m}{\overset{|}{Si}}(OR^1)_{3-m}}{\underset{OH-C}{\underset{\|}{\underset{O}{C}}-OH}}$$

(where Ar¹ is at least one group selected from among

[diphenyl ether],

-continued

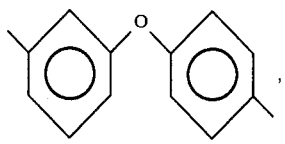

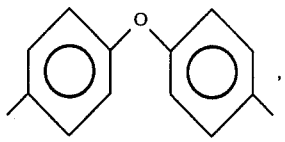

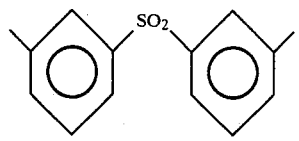

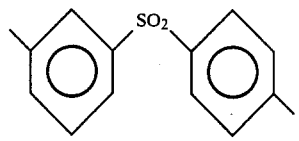

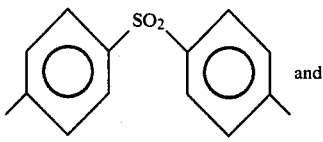

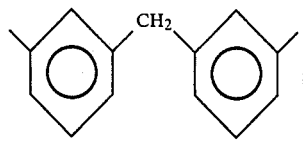

$Ar^2$ is at least one group selected from among

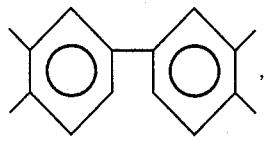

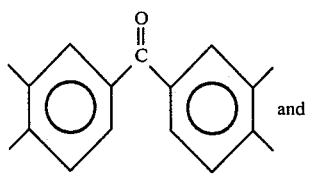

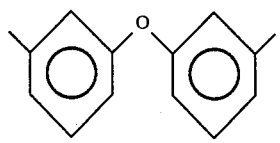

$R^1$ is methyl, ethyl, propyl, butyl or phenyl group;
$R^2$ is methyl, ethyl, butyl, phenyl, methoxy, ethoxy, propoxy, buthoxy or phenoxy group;
$R^3$ is methylene, ethylene, propylene, butylene or phenylene group;
m is 0, 1 or 2; and
n is an integer of from 1 to 100).

Since the polyimide precursor represented by the general formula (I) or (II) has high solubility in a solvent and forms a homogeneous and high-concentration polyamic acid varnish, films having various thickness can be formed easily. Preferred solvents are polar solvents such as N-methyl-2-pyrrolidone, benzylpyrrolidone, N,N-dimethylacetamide, dimethylformamide and dimethyl sulfoxide. Particularly when spinning coating to be described later is effected, the solvent is preferably N-methyl-2-pyrrolidone or N,N-dimethylacetamide. These solvents are used either alone or in admixture.

The inter-laminar insulation film of the magnetic bubble memory element is obtained by applying the polyamic acid varnish described above on an uneven substrate on which the conductor pattern is disposed and subjecting the substrate to thermosetting treatment to form a polyimide resin film. Though the coating methods include spinning coating, roll-coating, dipping, printing and the like, the spinning coating method is the most preferred method in order to form the film uniformly throughout the entire substrate surface with high producibility. The thermosetting treatment is effected at a temperature in the range of from 140° to 400° C., and preferably from 250° to 400° C., for 10 to 180 minutes, and preferably 30 to 120 minutes. The atmosphere used is an inert gas atmosphere of Ar, $N_2$ or the like, or a reduced-pressure state of 0.1 Pa or below.

The polyimide precursors of the formulas (I) and (II) described above have the following properties in common.

(1) They are molten and cause fluidization at a suitable temperature below the curing temperature of the polymer.

(2) They can remarkably reduce the inclination angle $\theta$ in the end portion of the conductor pattern due to their melt-fluidization.

(3) When heat-treated above a temperature at which they cause melt-fluidization, they are cured into a polymer having a large molecular weight.

A method of flattening the substrate surface by use of those resins which cause melt-fluidization upon heating is disclosed in Japanese Patent Laid-Open No. 121064/1982. However, this reference invention relates to an unevenness on the substrate surface and is directed to reduce the absolute value of the level difference. Accordingly, it is generally difficult to apply this method to the problems inherent in the magnetic bubble memory element dealt with by the present invention.

In other words, the first characterizing feature of the present invention is to obtain a second insulation film which keeps the inclination angle in the end portion of the conductor pattern in the range of 0° to 20° by a predetermined film thickness. Here, the "predetermined film thickness" is from 100 to 500 nm and preferably from 200 to 300 nm with respect to bubbles having a diameter of sub-microns below 1.2 μm. Though this value depends upon the pattern shape of the soft magnetic material pattern, the film thickness is preferably within the range described above in the transfer path of the soft magnetic material crossing transversely the conductor pattern.

FIG. 5 shows the required inclination angle so that the transfer margin is above 10% with respect to a given bubble diameter. As can be seen clearly from the diagram, the inclination angle must be below 20° when the bubble diameter is below 1.2 μm.

FIG. 6 is a diagram showing the relationship between the film thickness of the second insulation film formed on the conductor pattern and the inclination angle in the end portion of the conductor pattern. The diagram shows comparatively the curve of the resin film of the present invention and that of the prior art resin film. When the film thickness to set the inclination angle below the above-mentioned value is determined from FIG. 6, it is at least 300 nm in the case of the resin insulation film of the prior art and at least 150 nm in the resin insulation film of the present invention. On the other hand, the second insulation film is preferably from 200 to 300 nm thick for the reason described already. Therefore, it can be understood that in order to obtain good transfer characteristics, the resin insulation film of the present invention must be employed.

The second characterizing feature of the present invention lies in that the inclination angle in the end portion of the conductor pattern is reduced by use of the polyimide precursor of the general formula (I) or (II), which is molten by heating and cured, as the lower layer of the second insulation film, and forms a film having a glass transition temperature of at least 250° C. and preferably from 300° to 400° C. on the upper layer of the second insulation film so as to secure a great formation temperature margin for the soft magnetic material which is to be later formed on the second insulation film. In other words, the second insulation film as the base will not be cured thermally even in the formation process of the soft magnetic material by vacuum deposition at a temperature above 300° C., so that the occurrence of deformation of the film such as wrinkling is suppressed.

The materials that can provide such an effect include inorganic dielectrics such as alumina, silicon dioxide and silicon nitride, and a polyimide resin prepared by heating and curing a polyimide precursor represented by the following general formula (III). Among them, the polyimide resin is used preferably. When the polyimide resin is used, the resin is of the same kind as that of the lower layer and can be etched by the same etching process when a through-hole is formed thereon.

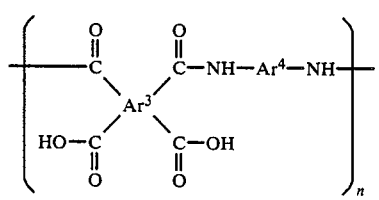

(III)

(where $Ar^3$ is at least one group selected from among

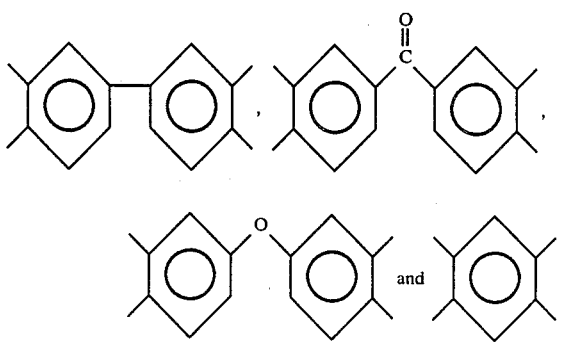

$Ar^4$ is the least one group selected from among

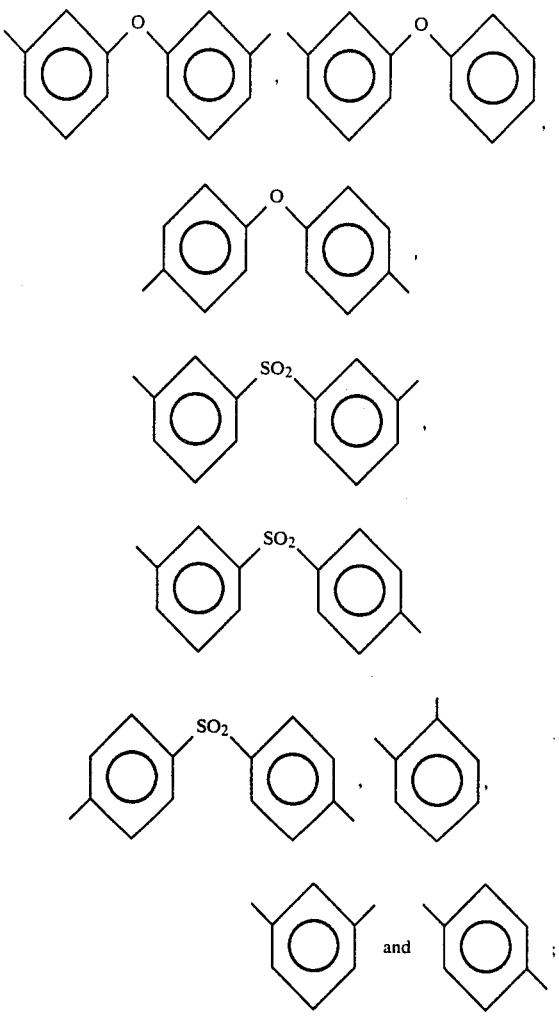

and n is an integer of 10 to 500).

DESCRIPTION OF THE PREFERRED EMBODIMENTS

Hereinafter, the present invention will be described in further detail with reference to some preferred embodiments thereof.

Embodiment 1

Figure 1A:
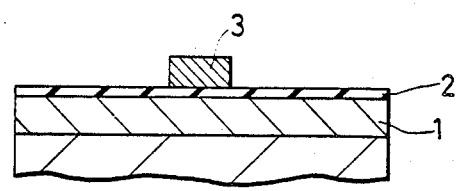
FIGS. 1a to 1d are diagrams showing the steps of the production of a magnetic bubble memory element in accordance with the first embodiment of the present invention.
Figure 1B:
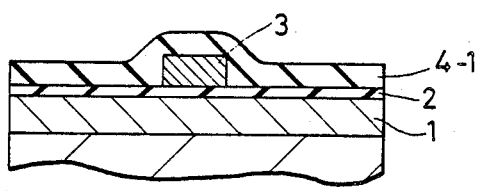
Figure 1C:
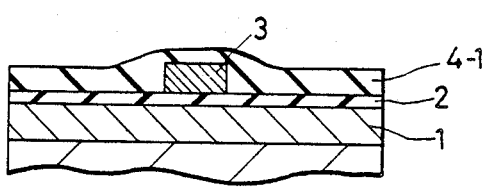

A silicon dioxide (SiO$_2$) film 2 as a first insulation film and a conductor pattern 3 using Au/Mo were formed on a bubble garnet film (bubble diameter of 0.9 μm) as shown in FIG. 1a. The thicknesses of SiO$_2$ and Au/Mo were 100 nm and 350 nm, respectively, and Mo was used as a bonding layer between SiO$_2$ and Au and was 20 nm thick. Next, an N,N-dimethylacetamide solution of a polyimide precursor (resin concentration of 10 wt%) represented by the following formula (corresponding to the general formula (I)) was spin-coated as shown in FIG. 1b, then heated and molten in a nitrogen atmosphere and thereafter cured to form an insulation film 4-1 as shown in FIG. 1c.

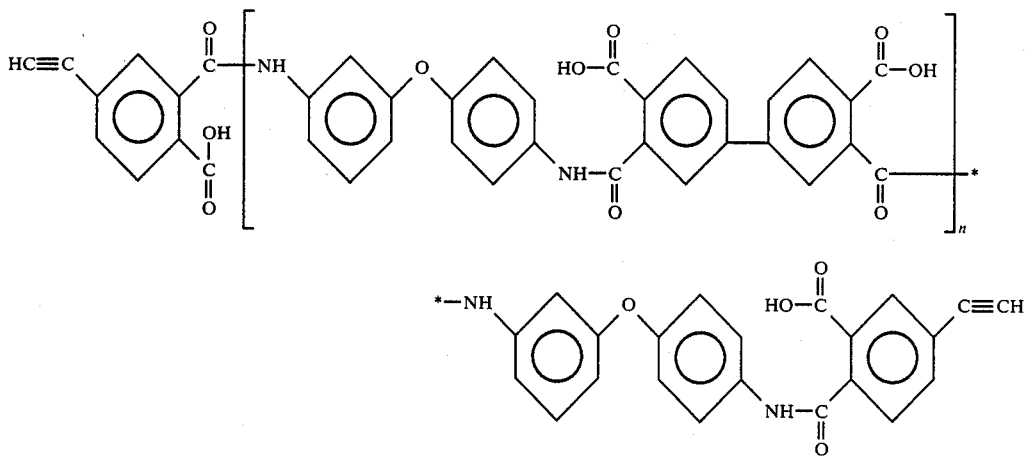

(n ≈ 5)

Figure 1D:
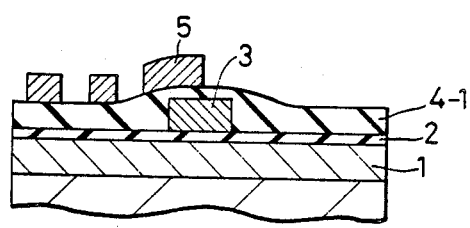

Heat-treatment was made at 200° C. for 30 minutes and then at 350° C. for 30 minutes. In this case, evaporation of the solvent, melt-fluidization and imidation occurred at up to 200° C., and cross-linking hardening occurred at a up to 350° C. Next, a soft mgnetic material film (350 nm thick) was formed on this insulation film 4-1 by high-frequency sputtering and, after a resist pattern was formed, the soft magnetic material was etched by ion milling, thereby forming a soft magnetic material pattern 5 as shown in FIG. 1d.

In the resulting magnetic bubble memory element, the inclination angle in the end portion of the conductor pattern was about 10° and the transfer margin was improved to 10 to 12% in comparison with the conventional transfer margin of 4 to 5%.

Embodiment 2

A magnetic bubble memory element was produced in the same way as in Embodiment 1 except that the insulation film 4-1 was formed by use of each of the polyimide precursors (corresponding to the general formula (I)) shown by Nos. 1 to 6 in Table 1, and the transfer margin of each of the resulting magnetic bubble memory elements was examined. The transfer margin was improved to 10 to 12% as represented by Nos. 1 to 6 in Table 1 from the conventional value of 4 to 5%.

TABLE 1
| No. | Structural formula | Solvent | Resin concn. | Transfer margin |
|---|---|---|---|---|
| 1 | 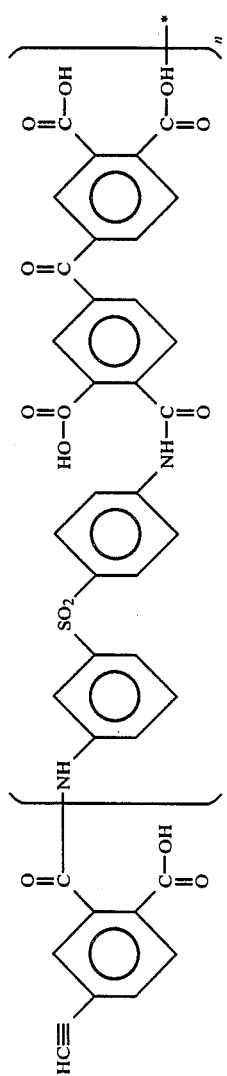 (n ≈ 10) | N—methyl-2-pyrrolidone | 8 wt % | 10~12% |
| 2 | 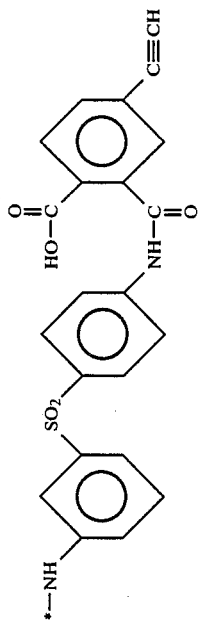 | N—methyl-2-pyrrolidone | 5 wt % | 10~12% |

TABLE 1-continued

| No. | Structural formula | Solvent | Resin concn. | Transfer margin |
|---|---|---|---|---|
| 3 | (structures shown, n ≈ 15 and n ≈ 4) | N—methyl-2-pyrrolidone/N,N—dimethyl acetamide (1:1 mixture) | 10 wt % | 10~12% |

TABLE 1-continued

| No. | Structural formula | Solvent | Resin concn. | Transfer margin |
|---|---|---|---|---|
| 4 | Polymer structure with repeating unit containing ethynyl-substituted phthalic acid amide, benzyl, phenyl ether, and phthalic acid amide groups (n ≈ 5) | N—methyl-2-pyrrolidone/N,N—dimethyl acetamide (1:1 mixture) | 10 wt % | 10~12% |
| 5 | Polymer structure with repeating unit containing norbornene dicarboxylic acid amide, phenyl ether, and biphenyl dicarboxylic acid amide groups | N,N—dimethyl-acetamide | 10 wt % | 10~12% |

TABLE 1-continued

| No. | Structural formula | Solvent | Resin concn. | Transfer margin |
|---|---|---|---|---|
| 6 | (structure shown, n ≈ 5) | N,N—dimethyl-acetamide | 10 wt % | 10~12% |
|   | (structure shown, n ≈ 5) | | | |

Embodiment 3

A magnetic bubble memory element was produced in the same way as in Embodiment 1 except that the insulation film 4-1 (FIGS. 1a to 1c) was formed by use of an N,N-dimethylacetamide solution (resin concentration of 8 wt%) of a polyimide precursor represented by the following formula (corresponding to the general formula (II)), to examine the transfer margin. The transfer margin is improved to 10 to 12% from the conventional value of 4 to 5%.

Embodiment 4

A magnetic bubble memory element was produced in the same way as in Embodiment 1 except that the insulation film 4-1 (FIGS. 1a to 1c) was formed by use of an N,N-dimethylacetamide or N-methyl-2-pyrrolidone solution (solid content of 5 to 10 wt%) of each of the polyimide precursors (corresponding to the general formula (II)) represented by Nos. 1 to 8 in Table 2 to examine the transfer margin. The transfer margin was improved to 10 to 12% from the conventional value of 4 to 5% as represented by Nos. 1 to 8 in Table 2.

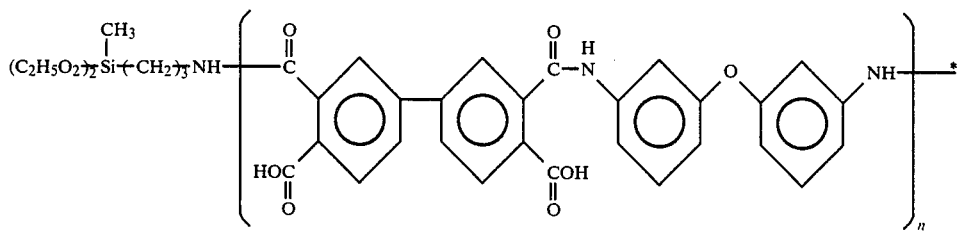

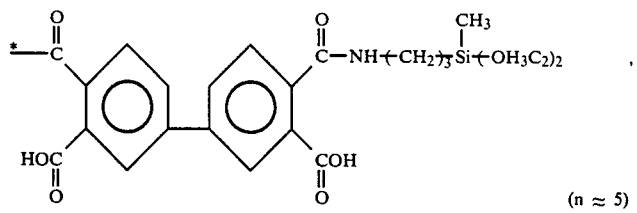

(n ≈ 5)

TABLE 2

| No. | Structural formula | Resin content (wt %) | Solvent | Transfer margin |
|---|---|---|---|---|
| 1 | (structure) | 5 | N,N-dimethyl acetamide | 10~12% |
| 2 | (structure) | 8 | N-methyl-2-pyrrolidone | " |
| 3 | (structure) | 8 | N-methyl-2-pyrrolidone | " |
| 4 | (structure) | 8 | N,N-dimethyl acetamide | " |

TABLE 2-continued

| No. | Structural formula | Resin content (wt %) | Solvent | Transfer margin |
|---|---|---|---|---|
| 5 | (structure with $C_2H_5O-Si(CH_3)_2-(CH_2)_3-NH-$ and $-NH-(CH_2)_3-Si(CH_3)_2-OC_2H_5$ end groups) | 10 | N,N—dimethylacetamide | " |
| 6 | (structure with $(C_4H_9O)_3-Si-$ phenyl end groups) | 10 | N—methyl-2-pyrrolidone | " |
| 7 | (structure with $(C_2H_5O)_2(CH_3)Si-$ phenyl end groups) | 10 | N—methyl-2-pyrrolidone | " |
| 8 | (structure with $(-O)_3Si(CH_2)_3NH-$ and $-NH(CH_2)_3Si(-O-)_3$ end groups) | 8 | N,N—dimethylacetamide | " |

Embodiment 5

Figure 2A:
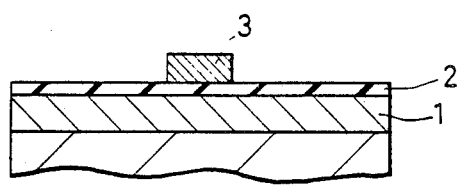
FIGS. 2a to 2d are diagrams showing the steps of the production of a magnetic bubble memory element in accordance with the fifth embodiment of the present invention.
Figure 2B:
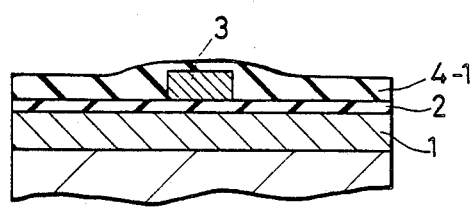
Figure 2C:
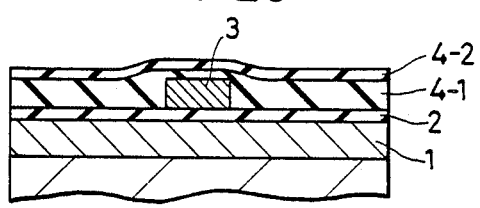
Figure 2D:
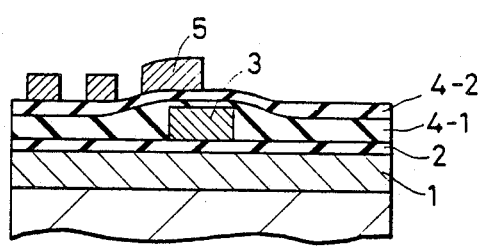
Figure 3:
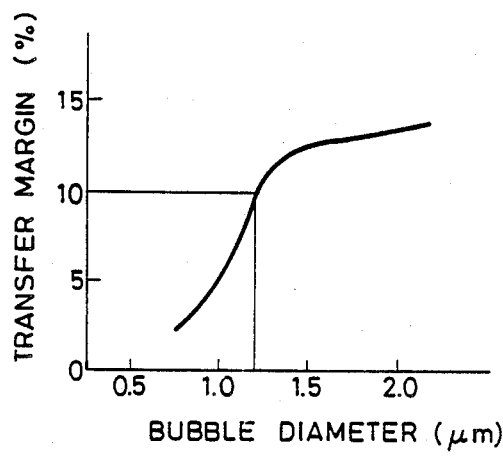
FIG. 3 is a diagram showing the relationship between a bubble diameter and a transfer margin in a magnetic bubble memory element using a conventional resin insulation film.
Figure 4:
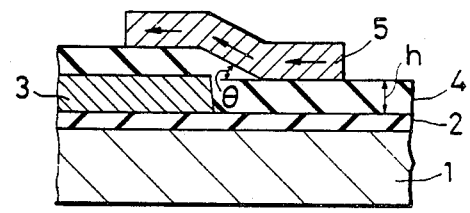
FIG. 4 is a schematic sectional view of the magnetic bubble memory element.
Figure 5:
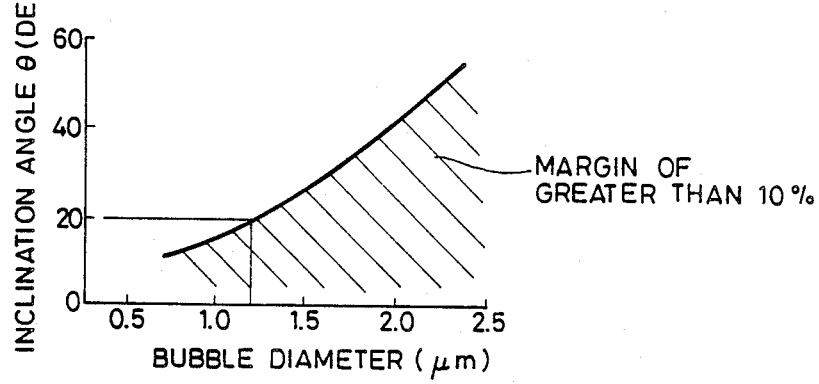
FIG. 5 is a diagram showing the relationship between a bubble diameter and an inclination angle $\theta$ that are necessary for securing a transfer margin of at least 10%.
Figure 6:
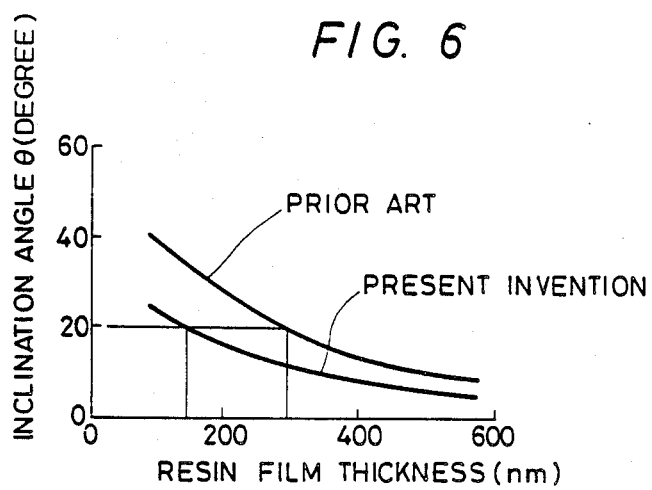
FIG. 6 is a diagram showing the relationship between the thickness (h) of the resin film and the inclination angle ($\theta$)

The insulation film 4-1 was formed in the same way as in Embodiment 1 (FIGS. 2a and 2b), and then an N,N-dimethylacetamide solution (resin content of 5 wt%) of a polyimide precursor represented by the following formula (corresponding to the general formula (III)) was spin-coated, heated and cured in a nitrogen atmosphere to form a 100 nm-thick upper insulation film 4-2 (FIG. 2c). Thereafter, a 350 nm-thick soft magnetic material was formed on this upper insulation film 4-2 by vacuum deposition at a substrate temperature of 330° C. A resist pattern was formed on the soft magnetic material layer, which was then etched by ion milling to form a soft magnetic material pattern 5 (FIG. 2d).

The resulting magnetic bubble memory element exhibited a good transfer margin of 10 to 12% in the same way as those in the foregoing Embodiments. The glass transition temperature of the upper insulation film was 350° C.

Embodiment 6

An upper insulation film 4-2 was formed in the same way as in Embodiment 1 by use of each of the polyimide precursors (corresponding to the general formula (III)) represented by Nos. 1 to 6 in Table 3. Thereafter, each magnetic bubble memory element was produced in exactly the same way as in Embodiment 4, and its transfer margin was examined. The transfer margin was improved to 10 to 12% from the conventional value of 4 to 5% as represented by Nos. 1 to 6 of Table 3.

(n ≈ 250)

TABLE 3

| No. | Structural formula | Solvent | Resin concentration | Glass transition temp. after heat cure | Transfer margin |
|---|---|---|---|---|---|
| 1 | (n ≈ 300) | N—methyl-2-pyrrolidone/ N,N—dimethylacetamido (1:1 mixture) | 8 wt % | ≧310° C. | 10~12% |
| 2 | (n ≈ 200) | N—methyl-2-pyrrolidone/ N,N—dimethylacetamido (1:1 mixture) | 8 wt % | ≧310° C. | 10~12% |
| 3 | (n ≈ 250) | N—methyl-2-pyrrolidone/ N,N—dimethylacetamido (1:1 mixture) | 8 wt % | ≧310° C. | 10~12% |

TABLE 3-continued

| No. | Structural formula | Solvent | Resin concentration | Glass transition temp. after heat cure | Transfer margin |
|---|---|---|---|---|---|
| 4 | (structure, n ≈ 300) | N—methyl-2-pyrrolidone/ N,N—dimethyl-acetamido (1:1 mixture) | 5 wt % | 305° C. | 10~12% |
| 5 | (structure, n ≈ 100) | N—methyl-2-pyrrolidone/ N,N—dimethyl-acetamido (1:1 mixture) | 10 wt % | 285° C. | 10~12% |
| 6 | (structure, n ≈ 300) | N—methyl-2-pyrrolidone/ N,N—dimethyl-acetamido (1:1 mixture) | 5 wt % | 280° C. | 10~12% |

Comparative Example

A magnetic bubble memory element was produced in exactly the same way as in Embodiment 1 except that the insulation film 4-1 was formed by use of an N,N-dimethylacetamide solution (resin content of 8 wt%) of a polyimide precursor represented by the following formula (FIGS. 1a to 1c). The transfer margin was 4 to 5%, which was extremely lower than those of the elements of the present invention described in Embodiments Nos. 1 to 5.

illustrates the result of comparison between the resin insulation film of the present invention with the conventional resin insulation film. These resin films are both 300 nm thick. It can be understood from the diagram that whereas the transfer margin when the conventional resin insulation film is used is 4% at the rotating magnetic field of 60 Oe, it is improved by thrice, i.e., to 12%, by use of the resin insulation film of the present invention.

As described above, the present invention makes it possible to form highly accurately the second insulation

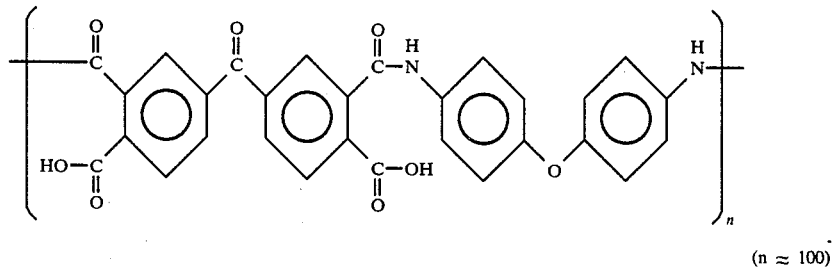

(n ≈ 100)

Figure 7:
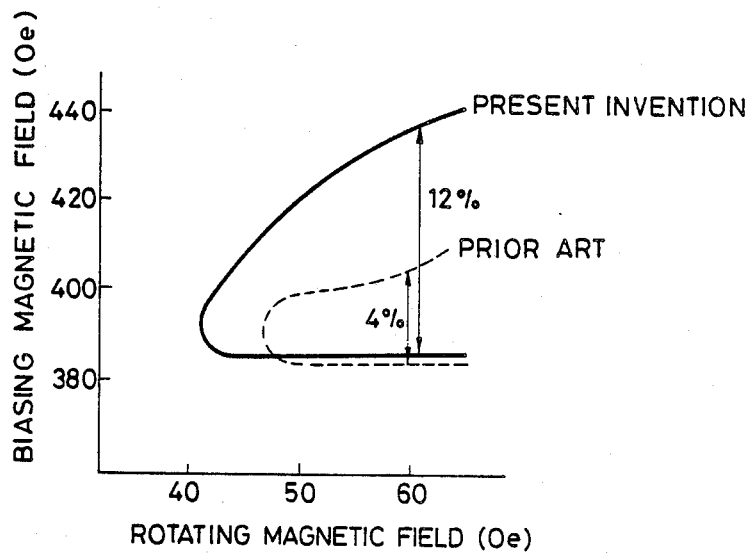
FIG. 7 is a diagram showing the relationship between a rotating magnetic field and a bias magnetic field.

In accordance with the present invention, the inclination angle in the end portion of the conductor pattern is reduced remarkably, and a remarkable effect of improvement in the characteristics can be observed particularly in magnetic bubble memory elements having a very small bubble diameter (below 1.2 μm). FIG. 7 is a diagram showing the relationship between the transfer margin and the rotating magnetic field in the transfer path of the soft magnetic material crossing transversely the conductor pattern with respect to the magnetic film having a bubble diameter of 0.9 μm, and the diagram film by the simple method of coating and heat-treatment, and produce the magnetic bubble memory element having excellent characteristics with high reproducibility.

What is claimed is:

1. A magnetic bubble memory element comprising a magnetic film capable of retaining a magnetic bubble, a first insulation film, a conductor pattern, a second insulation film and a soft magnetic material pattern deposited and laminated on a non-magnetic substrate in which a bubble diameter is up to 1.2 μm, wherein said second insulation film comprises a polymer resin having thermal fluidity in a curing process, has an inclination angle at an end portion of said conductor pattern in the range of 0° to 20° and is formed by heating and curing a polyimide precursor represented by the following general formula (I) or (II):

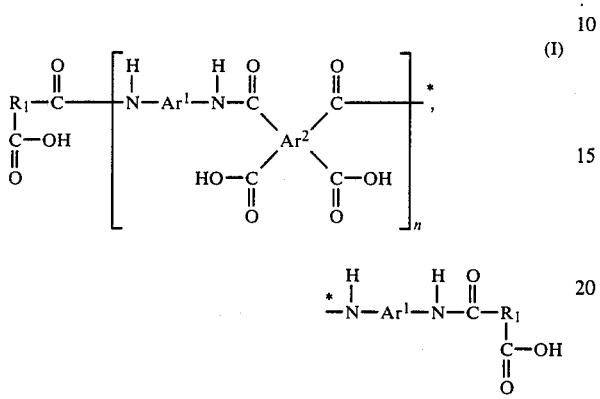
(I)

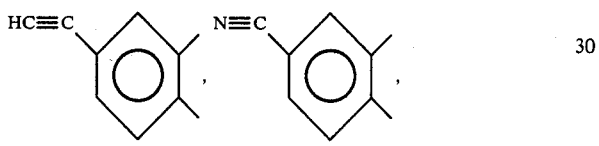

(where R₁ is at least one group selected from among

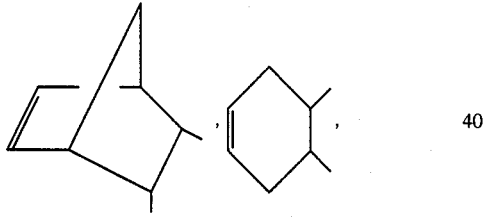

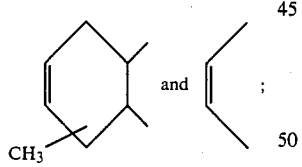

Ar¹ is at least one group selected from among

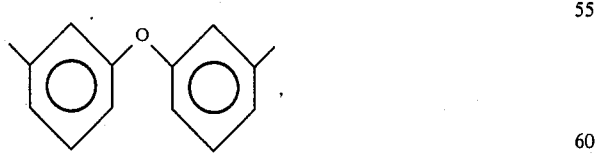

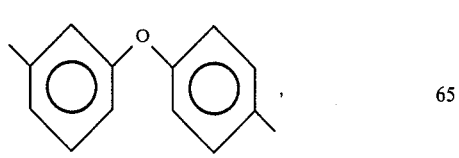

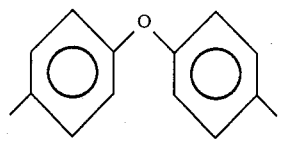

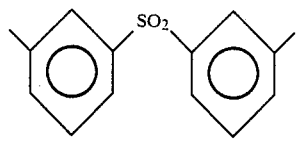

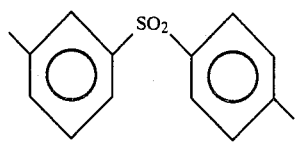

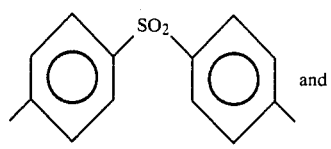 and

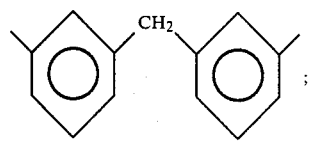

Ar² is at least one group selected from among

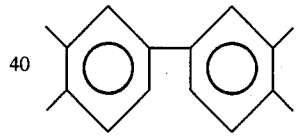

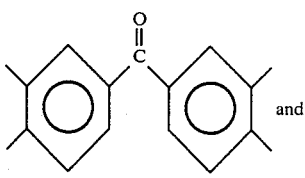 and

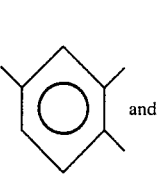

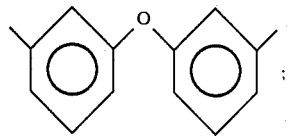

and n is an integer of from 1 to 20); or

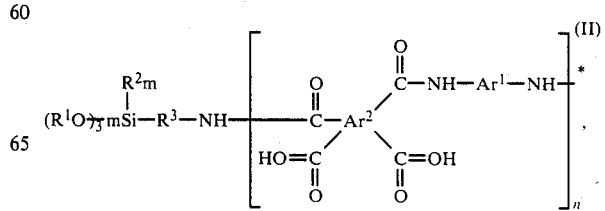
(II)

-continued

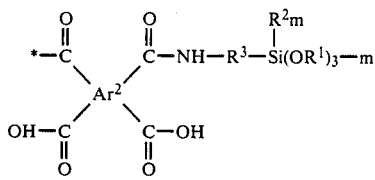

(where Ar¹ is at least one group selected from among

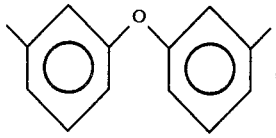

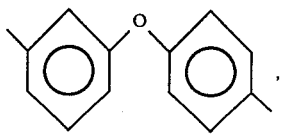

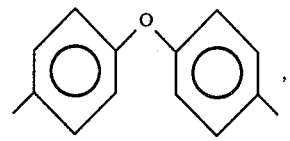

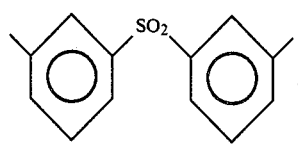

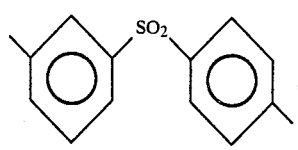

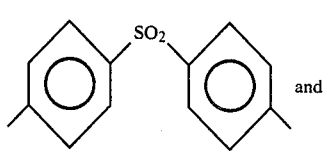

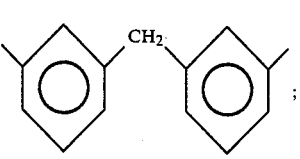

Ar² is at least one group selected from among

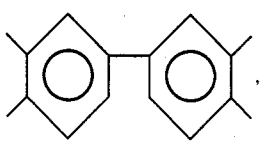

-continued

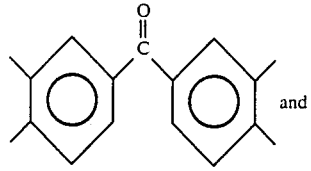 and

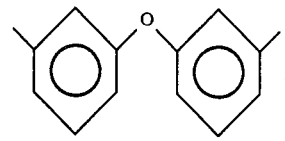 :

R¹ is a methyl, ethyl, propyl, butyl or phenyl group;
R² is a methyl, ethyl, butyl, phenyl, methoxy, ethoxy, propoxy, buthoxy or phenoxy group;
R³ is a methylene, ethylene, propylene, butylene or phenylene group;
m is 0, 1 or 2; and
n is an integer of from 1 to 100), whereby an inclination angle of said second insulation film at an end portion of said conductor pattern is reduced as compared to an inclination angle of a second insulation film in a magnetic bubble memory element having a second insulation film not comprising a polymer resin having thermal fluidity in a curing process and formed by heating and curing a polyimide precursor represented by said general formula (I) or (II).

2. A magnetic bubble memory element according to claim 1, wherein said magnetic film is deposited over said non-magnetic substrate, said first insulation film is deposited over said magnetic film, said conductor pattern is deposited over said first insulation film, said second insulation film is deposited over said conductor pattern and said soft magnetic material pattern is deposited over said second insulation film.

3. A magnetic bubble memory element according to claim 2, wherein said second insulation film is spin-coated over said conductor pattern.

4. A magnetic bubble memory element according to claim 1, wherein said insulation film has a thickness from 100 to 500 nm.

5. A magnetic bubble memory element according to claim 1, wherein said second insulation film has a thickness from 200 to 300 nm.

6. A magnetic bubble memory element according to claim 1, wherein said second insulation film is formed over said conductor pattern, an upper insulation film is formed over said second insulation film and said soft magnetic material is formed over said upper insulation film, and wherein said upper insulation film has a glass transition temperature of at least 250° C.

7. A magnetic bubble memory element according to claim 6, wherein said upper insulation film is made of a material selected from the group consisting of alumina, silicon dioxide, silicon nitride and polyimide resin.

8. A magnetic bubble memory element according to claim 1, wherein said second insulation film consists of two layers and has an inclination angle at an end portion of said conductor pattern in the range of 0° to 20°, a lower layer being prepared by heating and curing a polyimide precursor represented by the following general formula (I) or (II), and an upper layer having a glass transition temperature of at least 250° C.:

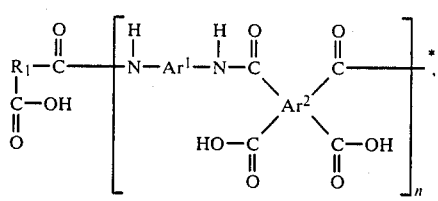 (I)
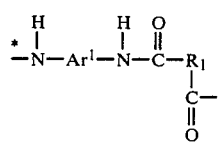
(where R₁ is at least one group selected from among
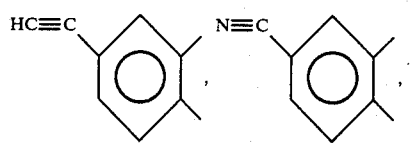
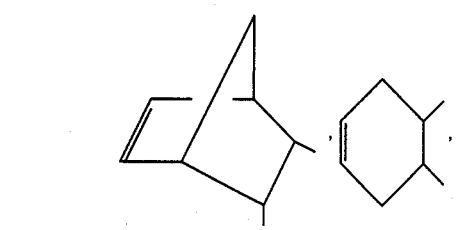
Ar¹ is at least one group selected from among
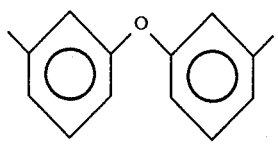,
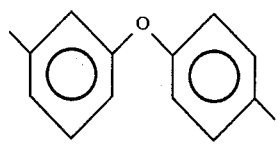,
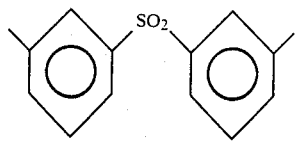,
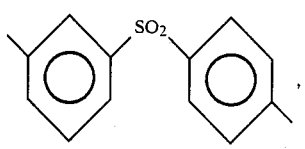,
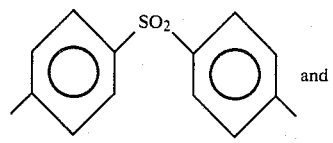 and
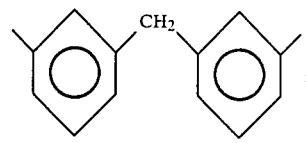;
Ar² is at least one group selected from among
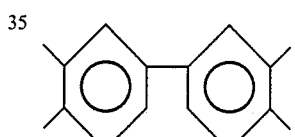,
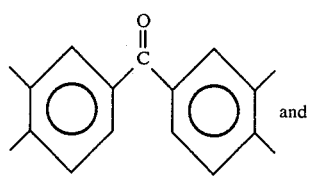 and
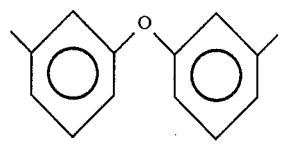;
n is an integer of from 1 to 20); or
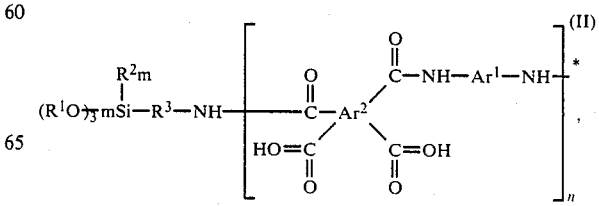 (II)

-continued

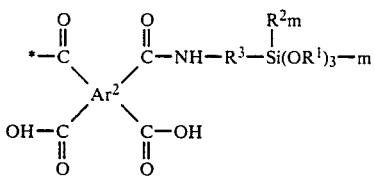

(where Ar¹ is at least one group selected from among

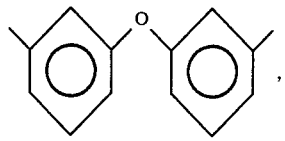,

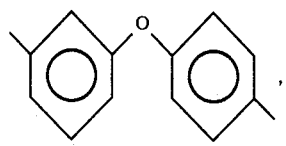,

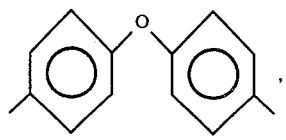,

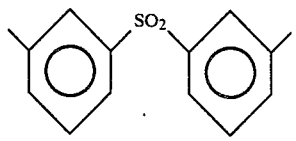,

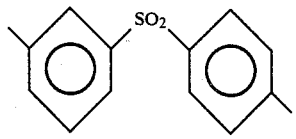,

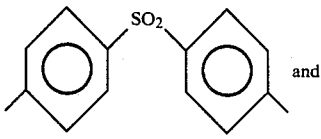 and

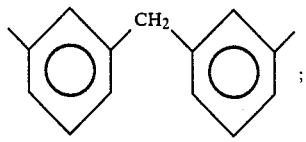;

Ar² is at least one group selected from among

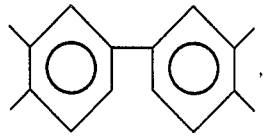,

-continued

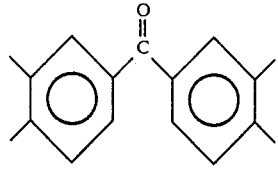 and

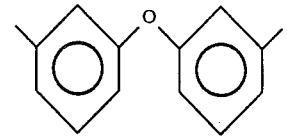;

R¹ is methyl, ethyl, propyl, butyl or phenyl group;
R² is methyl, ethyl, butyl, phenyl, methoxy, ethoxy, propoxy, buthoxy or phenoxy group;
R³ is methylene, ethylene, propylene, butylene or phenylene group;
m is 0, 1 or 2; and
n is an integer of from 1 to 100).

9. A magnetic bubble memory element according to claim 8, wherein said upper layer of said second insulation film is prepared by heating and curing a polyimide precursor represented by the following general formula (III):

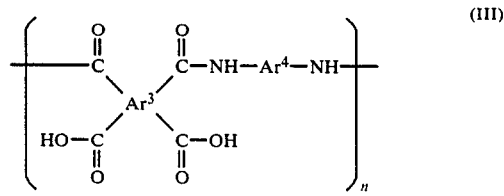 (III)

(where Ar³ is at least one group selected from among

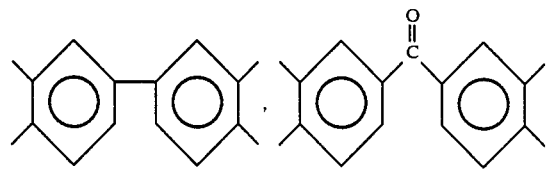

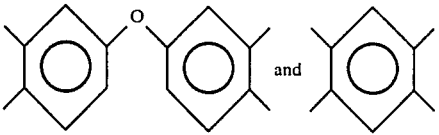 and 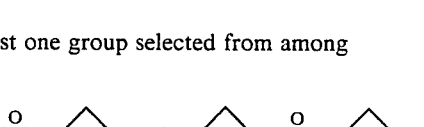;

Ar⁴ is at least one group selected from among

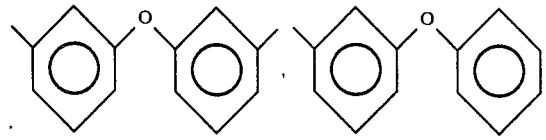

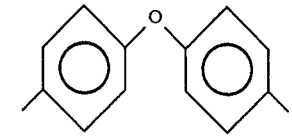.

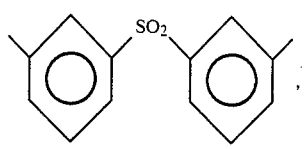
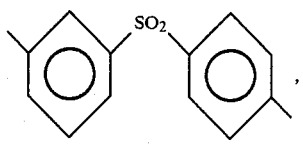
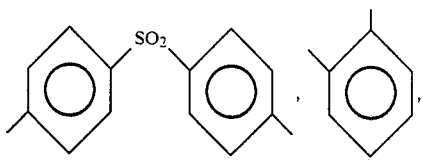
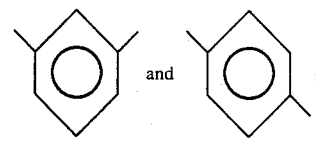
and n is an integer of from 10 to 500).
* * * * *